(12) United States Patent
Leng

(10) Patent No.: US 9,346,542 B2
(45) Date of Patent: May 24, 2016

(54) ELECTRICALLY POWERED AERIAL VEHICLES AND FLIGHT CONTROL METHODS

(71) Applicant: Markus Leng, Warkworth (CA)

(72) Inventor: Markus Leng, Warkworth (CA)

(73) Assignee: SkyKar Inc., Etobicoke, ON (CA)

( * ) Notice: Subject to any disclaimer, the term of this patent is extended or adjusted under 35 U.S.C. 154(b) by 267 days.

(21) Appl. No.: 14/046,729

(22) Filed: Oct. 4, 2013

(65) Prior Publication Data

US 2014/0097290 A1    Apr. 10, 2014

Related U.S. Application Data

(60) Provisional application No. 61/710,216, filed on Oct. 5, 2012.

(51) Int. Cl.
| | |
|---|---|
| *B64C 27/22* | (2006.01) |
| *B64C 27/26* | (2006.01) |
| *B64C 29/00* | (2006.01) |
| *B64C 29/02* | (2006.01) |
| *B64C 39/02* | (2006.01) |

(52) U.S. Cl.
CPC .............. *B64C 27/26* (2013.01); *B64C 29/00* (2013.01); *B64C 29/0025* (2013.01); *B64C 29/02* (2013.01); *B64C 39/026* (2013.01)

(58) Field of Classification Search
USPC .......... 244/6, 45 R, 55, 17.23, 23 B, 8, 17.11, 244/23
See application file for complete search history.

(56) References Cited

U.S. PATENT DOCUMENTS

| | | | |
|---|---|---|---|
| 3,259,343 A | 7/1966 | Roppel | |
| 3,410,507 A | 11/1968 | Moller | |
| 4,071,207 A | 1/1978 | Piasecki et al. | |
| 4,171,784 A | 10/1979 | Eickmann | |
| D312,068 S | 11/1990 | Moller | |
| 5,115,996 A | 5/1992 | Moller | |
| 5,419,514 A * | 5/1995 | Ducan ................ | B64C 29/0033 244/12.4 |
| 6,325,603 B1 | 12/2001 | Moller | |
| 6,450,445 B1 | 9/2002 | Moller | |

(Continued)

OTHER PUBLICATIONS

International Search Report and Written Opinion for PCT/CA2013/000846, dated Dec. 16, 2013.

(Continued)

*Primary Examiner* — Christopher P Ellis
(74) *Attorney, Agent, or Firm* — Eugene F. Derenyi; Fogler, Rubinoff LLP

(57) ABSTRACT

An aerial vehicle includes at least one wing, a plurality of thrust producing elements on the at least one wing, a plurality of electric motors equal to the number of thrust producing elements for individually driving each of the thrust producing elements, at least one battery for providing power to the motors, and a flight control system to control the operation of the vehicle. The aerial vehicle may include a fuselage configuration to facilitate takeoffs and landings in horizontal, vertical and transient orientations, redundant control and thrust elements to improve reliability and means of controlling the orientation stability of the vehicle in low power and multiple loss of propulsion system situations. Method of flying an aerial vehicle includes the variation of the rotational speed of the thrust producing elements to achieve active vehicle control.

19 Claims, 8 Drawing Sheets

(56) References Cited

U.S. PATENT DOCUMENTS

| | | |
|---|---|---|
| 6,581,873 B2 | 6/2003 | McDermott |
| 6,808,140 B2 | 10/2004 | Moller |
| D498,201 S | 11/2004 | Moller |
| 7,137,592 B2 | 11/2006 | Barocela et al. |
| 7,188,803 B2 * | 3/2007 | Ishiba ................. B64C 29/0025 244/23 R |
| 7,959,104 B2 * | 6/2011 | Kuntz .................... A63H 17/00 244/2 |
| 8,002,216 B2 | 8/2011 | Decker |
| 8,733,690 B2 * | 5/2014 | Bevirt ................. B64C 29/0033 244/12.4 |
| 2005/0178879 A1 | 8/2005 | Mao |
| 2005/0230519 A1 | 10/2005 | Hurley |
| 2008/0265088 A1 * | 10/2008 | Choi ...................... A63H 27/02 244/55 |
| 2011/0042508 A1 | 2/2011 | Bevirt |
| 2012/0012692 A1 * | 1/2012 | Kroo .......................... B64C 3/56 244/6 |
| 2012/0056040 A1 | 3/2012 | Brotherton-Ratcliffe et al. |
| 2012/0280091 A1 * | 11/2012 | Saiz ......................... B64C 27/26 244/7 R |
| 2012/0286102 A1 | 11/2012 | Sinha et al. |
| 2013/0020429 A1 * | 1/2013 | Kroo .......................... B64C 3/16 244/6 |
| 2013/0026303 A1 | 1/2013 | Wang |
| 2014/0367509 A1 * | 12/2014 | Smith ................. B64C 29/0033 244/12.4 |

OTHER PUBLICATIONS

"e-volo personal helicopter", undated, www.designboom.com/weblog/cat/16/view/17400/e-volo-personal-helicopter.html, pp. 1-6, accessed Sep. 10, 2012.

"Regenerative Electric-Powered Aircraft", Jun. 30, 2011, http://contest.techbriefs.com/2011/entries/transportation/1931, p. 1 of 2, accessed Jun. 29, 2012.

"Flying car wows EAA AirVenture in Oshkosh", http://www.usatoday.com/story/money/cars/2013/08/01/flying-car-terrafugia-eaa-oshkosh/2607565/ dated Aug. 1, 2013, accessed Jan. 5, 2016.

"Titan Aerospace readies solar-powered, long-endurance UAVs", Aug. 22, 2013 by Nancy Owano, http://phys.org/news/2013-08-titan-aerospace-readies-solar-powered-long-endurance.html, accessed Jan. 5, 2016.

"Lockheed Martin to build Transformer TX—Autonomous flying payload carrier", Aug. 20, 2013 by Bob Yirka, http://phys.org/news/2013-08-lockheed-martin-txautonomous-payload-carrier.html, accessed Jan. 5, 2016.

"VTOL—Wingcopter Rotorschwenkversuch", Published on Jul. 27, 2012, https://www.youtube.com/watch?v=rT_Qxba4X04, accessed Jan. 5, 2016.

* cited by examiner

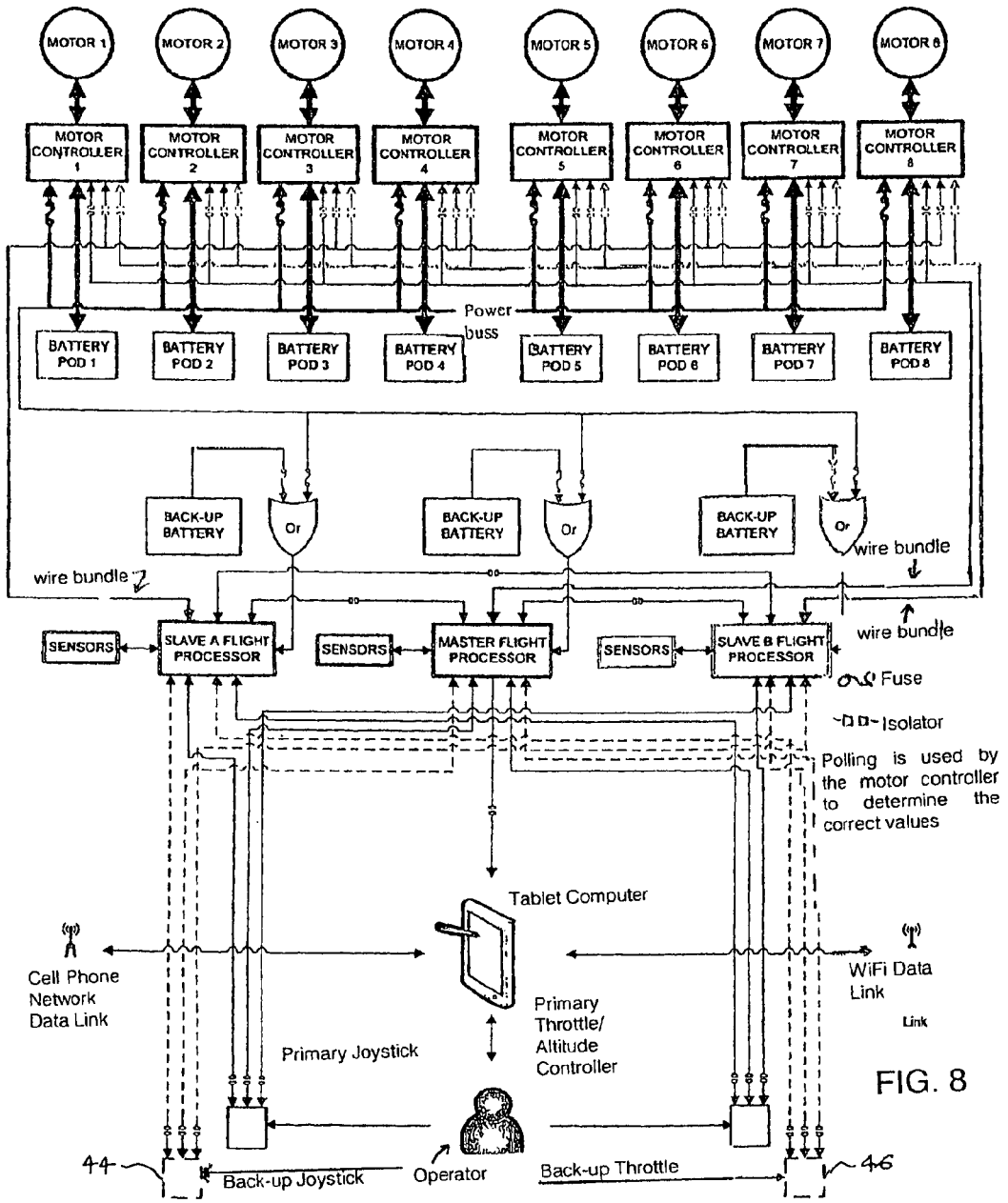

ELECTRICALLY POWERED AERIAL VEHICLES AND FLIGHT CONTROL METHODS

CROSS-REFERENCE TO RELATED APPLICATIONS

This application claims the benefit of priority from U.S. Provisional Application Ser. No. 61/710,216 filed Oct. 5, 2012 which is incorporated herein by reference.

TECHNICAL FIELD

This invention relates to the field of aerial vehicles in general and the field of electrically powered aerial vehicles and a flight control methods in particular.

BACKGROUND

Electrically powered aerial vehicles and in particular vertical takeoff and landing (VTOL) vehicles have helicopter type configurations or wing type configurations in which the engines must articulate (either on their own or with rotatable wings) for vertical and horizontal translational flight. Such vehicles are complicated.

SUMMARY

According to one aspect of the present invention there is provided an aerial vehicle including a cockpit located on a central longitudinal axis of the vehicle, a fixed, elongated rectilinear wing spaced apart from each end of the cockpit and extending perpendicular to the central longitudinal axis, struts connecting the ends of the wings to the cockpit and to each other, a plurality of propellers on a leading edge of each wing, the propellers having rotational axis such that the wash from the propellers is directed along the surfaces of the wing to provide lift and forward thrust to the vehicle, a plurality of electric motors for driving the propellers, at least one battery for providing power to the motors, and a flight control system having a separate motor controller for each motor to control the rotational speed of each propeller. According to another aspect of the present invention there is provided an aerial vehicle including a fuselage located on a central longitudinal axis of the vehicle, an elongated rectilinear wing extending perpendicular to the central longitudinal axis and fixed to each end of the fuselage, a plurality of propellers on a leading edge of each wing, the propellers having rotational axis such that the wash from the propellers is directed along at least one surface of the wing to provide lift and forward thrust to the vehicle, a plurality of electric motors for driving the propellers, at least one battery for providing power to the motors, and a flight control system having a separate motor controller for each motor to control the rotational speed of each propeller.

According to a further aspect of the present invention, there is provided a method of flying an aerial vehicle including a cockpit, upper and lower wings attached to the cockpit and a plurality of propellers on each wing, the steps including increasing or decreasing the rotational speed of propellers on one wing relative the rotational speed of propellers on the other wing whereby the orientation of the vehicle relative to the pitch axis can be varied.

According to a still further aspect of the present invention, there is provided a method of flying an aerial vehicle including a fuselage, first and second wings attached to the fuselage and a plurality of propellers on each wing, the steps including increasing or decreasing the rotational speed of propellers on one wing relative to the rotational speed of propellers on the other wing whereby the orientation of the vehicle relative to the pitch axis can be varied.

According to a still further aspect of the present invention, one or more of the propellers are sized and configured for a first speed or condition, such as hover, while one or more other propellers are optimized for one or more other speeds, such as, for horizontal flight. For example, in an eight propeller configuration, four propellers can be optimized for hover flight in terms of one or more of the pitch, diameter, foil design and number of blades while four additional propellers can be optimized for forward flight, again in terms of one or more of the pitch, diameter, foil design and number of blades. In certain other aspects, one or more of the pitch, diameter, foil design and number of blades of one or more of the propellers may be varied to adapt the propellers for one or more other desired performance characteristic.

According to a further aspect of the present invention, there is provided a method of flying an aerial vehicle including a cockpit, upper and lower wings staggered vertically and longitudinally relative to each other and a plurality of propellers on each wing, the steps including increasing or decreasing the rotational speed of propellers on one wing relative the rotational speed of propellers on the other wing whereby the orientation of the vehicle relative to the pitch axis can be varied.

According to a still further aspect of the present invention, there is provided an active control system for control of an aerial vehicle with a plurality of thrust producing elements of eight or more wherein the thrust producing elements are grouped into logical and physical quadrants comprising of two or more thrust producing elements each. The control system allows for the control of the thrust producing elements in the event of failure of all propulsion systems in the same quadrant by allowing some of the thrust producing elements in the opposite quadrant to produce negative thrust. This method allows for all thrust producing elements, other than the elements operating in reverse, to operate in a range allowing for controllability.

According to a still further aspect of the present invention, there is provided an aerial vehicle including one or more wings, three or more thrust producing elements mounted in a fixed non-articulating relationship to the one or more wings, a plurality of electric motors for driving the thrust producing elements, at least one battery for providing power to the motors, and a flight control system having a motor controller for controlling the rotational speed and direction of rotation of each thrust producing element.

In certain embodiments, the vehicle may further include a fuselage located on a central longitudinal axis of the vehicle, wherein the one or more wings comprising two wings extending perpendicular to the central longitudinal axis, the wings are stacked and spaced from each other along the central longitudinal axis and along an axis perpendicular to the central longitudinal axis.

In certain embodiments, the vehicle may further include a bottom having a first facet at a first angle and a second facet at a second angle, whereby the vehicle rests at a first orientation when resting on the first facet and rests at a second orientation when the vehicle rests on the second facet, wherein the first orientation may be conducive to a vertical or near vertical take-off and the second orientation may be conducive to a horizontal or near horizontal take-off.

In certain embodiments, the aerial vehicle is tailless, and the control system is adapted vary the amount of rotational energy absorbed by individual motors when the individual motors are operated in a generator mode and are driven by rotation of the thrust producing elements connected to the individual motors, thereby effecting control of the orientation of the vehicle without the use of control surfaces.

In certain embodiments, the number of thrust producing elements is at least eight, the thrust producing elements are grouped into four quadrants with at least two thrust producing elements located in each quadrant, the control system is adapted to reverse the rotation of a first thrust control element in a first quadrant, vary the rotation of a second thrust control element in the first quadrant, when all thrust control elements are not operating in a quadrant opposite the first quadrant, thereby effecting control of the orientation of the vehicle.

In certain embodiments, one or more of the thrust producing elements are adapted for hover and one or more of the thrust producing elements are adapted for forward flight.

In certain embodiments, the vehicle further includes a battery energy level monitor for determining the energy level in the battery configured to take a first measurement of the voltage in the battery at an initial epoch under a substantially no-load condition, relate the voltage measurement to a value of potential energy stored in the battery at the initial epoch, take a second measurement of voltage in the battery and a measurement of current flow into or out of the battery at a subsequent epoch, integrate the second measurement of voltage and the current flow measurement with respect to time, determine an energy change from the integration, and relate the energy change to the initial energy level to calculate the energy level of the battery at the subsequent epoch.

In certain embodiments, the aerial vehicle in horizontal or near horizontal flight, the control system is adapted to increase rotation of some of the thrust producing elements to make a yaw turn whereby the vehicle turns substantially around the yaw axis but does not turn substantially around the pitch or roll axis.

According to a still further aspect of the present invention, there is provided a method of operating an aerial vehicle comprising one or more wings, three or more thrust producing elements mounted in a fixed non-articulating relationship to the one or more wings, and a plurality of electric motors for driving the thrust producing elements, including differentially varying the thrust of the thrust producing elements thereby altering the orientation of the vehicle.

In certain embodiments, the method further includes differentially varying the amount of rotational energy absorbed by the individual motors when the individual motors are operated in a generator mode and are driven by rotation of the thrust producing elements connected to the individual motors, thereby effecting control of the orientation of the vehicle without the use of control surfaces.

In certain embodiments, the number of thrust producing elements is at least eight and the thrust producing elements are grouped into four quadrants with at least two thrust producing elements located in each quadrant, and the method further includes reversing the rotational direction of a first thrust control element in a first quadrant, varying the rotational speed of a second thrust control element in the first quadrant, when all thrust control elements are not operating in a quadrant opposite the first quadrant, thereby effecting control of the orientation of the vehicle.

In certain embodiments, the method further includes providing a battery for providing power to the motors, monitoring the energy level in the battery including taking a first measurement of the voltage in the battery at an initial epoch under a substantially no-load condition, relating the voltage measurement to a value of potential energy stored in the battery at the initial epoch, taking a second measurement of voltage in the battery and a measurement of current flow into or out of the battery at a subsequent epoch, integrating the second measurement of voltage and the current flow measurement with respect to time, determining an energy change from the integration, and relating the energy change to the initial energy level to calculate the energy level of the battery at the subsequent epoch.

In certain embodiments, the method further includes increasing the rotational speed of some of the thrust producing elements to yaw the vehicle thereby inducing the vehicle to roll.

DRAWINGS

The invention is described below in greater detail with reference to the accompanying drawings which illustrate preferred embodiments of the invention, and wherein.

DETAILED DESCRIPTION

Figure 1:
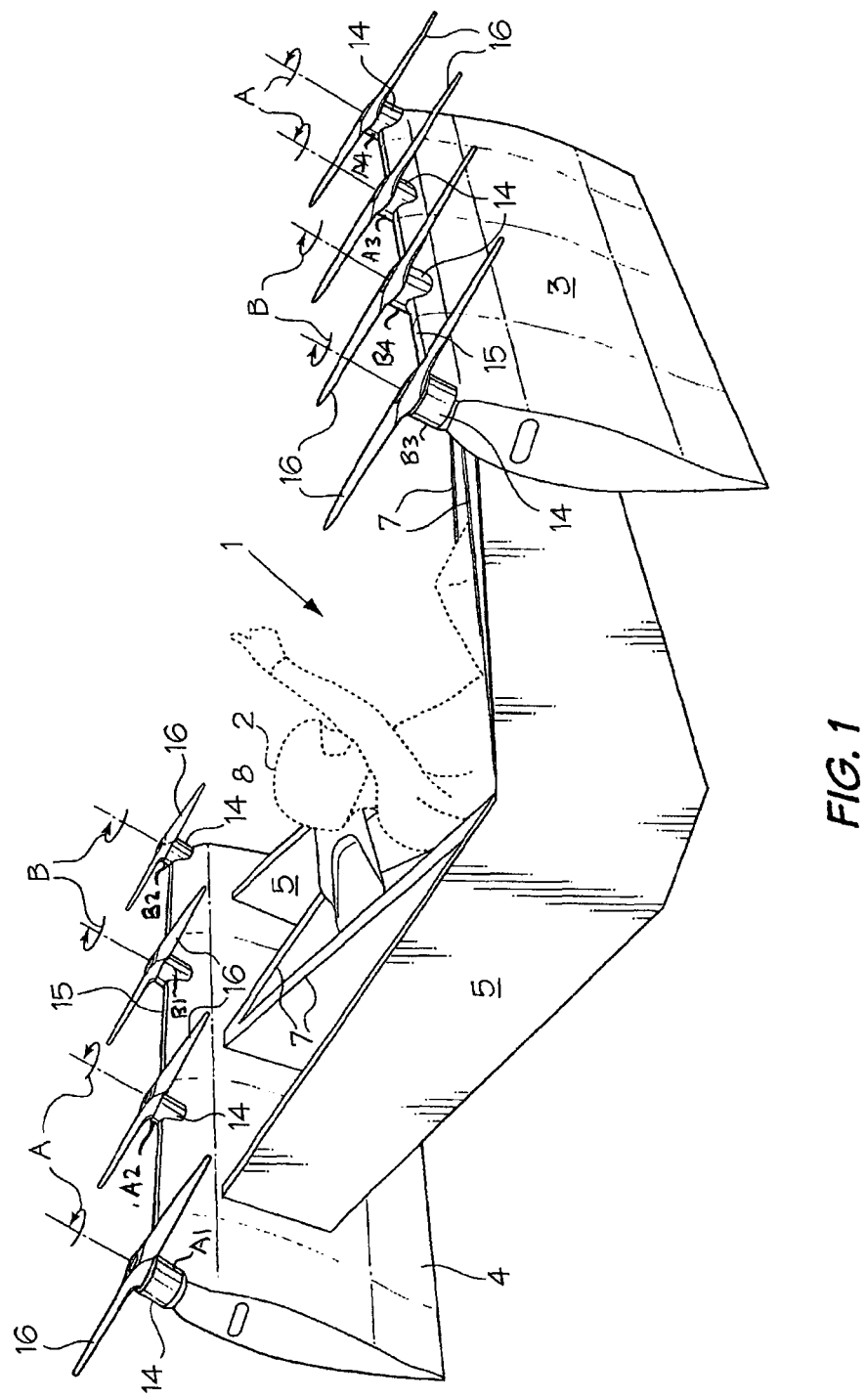
FIG. 1 is a perspective view of an aerial vehicle according to an embodiment of the present invention.
Figure 2:
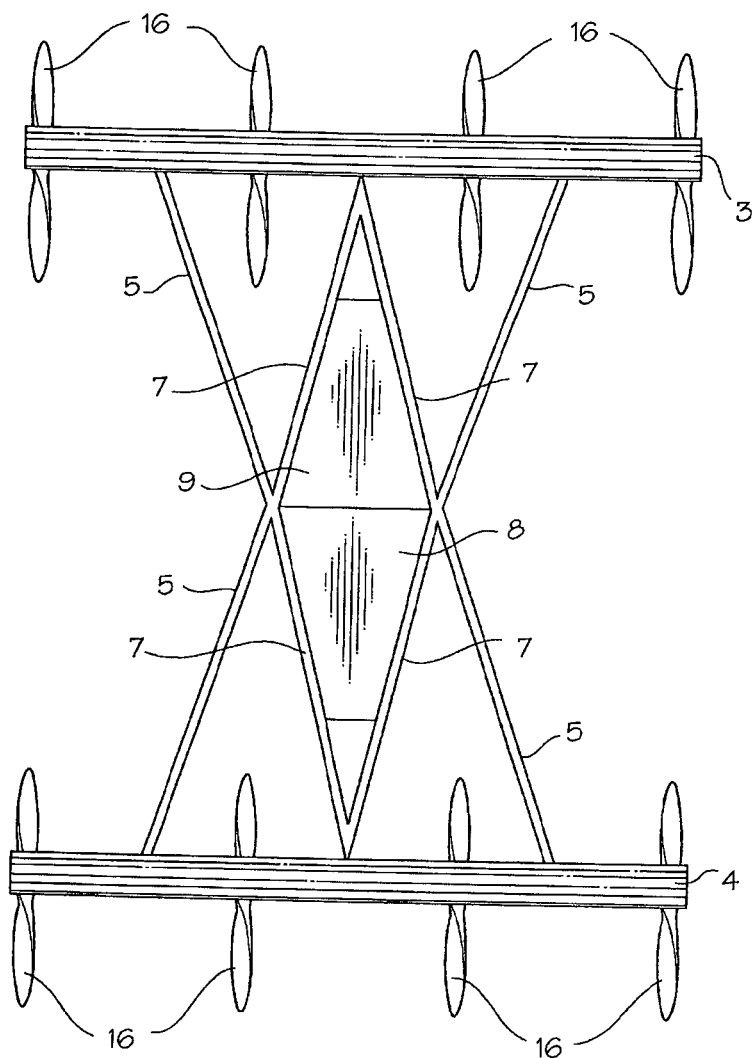
FIG. 2 is a bottom view of the vehicle of FIG. 1.

Referring to FIGS. 1 and 2 of the drawings, one embodiment of the aerial vehicle of the present invention includes a cockpit indicated generally at 1 for accommodating an operator 2. Wings 3 and 4 are spaced apart from the front and rear of the cockpit 1. The wings 3 and 4 are perpendicular to the central longitudinal axis of the vehicle. A first pair of outer struts 5 extend between the wings 3 and 4 on each side of the cockpit 1. The outer struts 5 are connected to the wings 3 and 4 proximate their outer ends. The struts 5 are also connected to the centers of the sides of the cockpit 1.

The sides of the cockpit 1 are defined by inner struts 7, which define a diamond shaped structure extending between the centers of the wings 3 and 4. The cockpit 1 is basically a backrest 8 and a floor 9 (FIG. 2) extending between the struts 7. The struts 5 are connected to the inner struts 7 and thus to the cockpit at the longitudinal center of the vehicle. The struts 5 and 7 are connected to the wings 3 and 4 by barrel hinges (not shown), which include removable pivot pins. Of course, the struts can be permanently connected to the wings 3 and 4. By the same token, the cockpit 1 can separate from and permanently connected to the struts 5 and 7 or removable for disassembly of the vehicle for transporting it in pieces. In other embodiments, a fuselage may be provided. In further embodiments, the vehicle may have more than two wings, for example three wings, and motors may be provided on more than two wings.

Each of the elongated, rectilinear wings 3 and 4 includes an inner box or frame (not shown) formed of a rigid foam such as Styrofoam® covered by a layer of epoxy-carbon composite. The box contains four electric batteries 13 (FIG. 6) for providing energy to a like number of DC electric motors 14. In other embodiments, the wings 3 and 4 may be of different construction and the electric batteries may be housed elsewhere in the vehicle.

The motors 14 are electronically commutated motors, and preferable outrunner brushless DC motors. The motors 14 may be air cooled using a vacuum disc (not shown) for evacuating air from the motors and in turn drawing air into the motors 14 preferably from the back of the motors. The vacuum discs are driven by the motors 14 and help cool the motors 14 especially when air is not flowing to the motors 14 when the vehicle is stationary, such as when the vehicle is on the ground or hovering. The motors 14 also include flux rings (not shown) defined by steel rings with super magnets spaced around the inner circumferences of the steel rings and stators inside the rings. In one embodiment of the present invention, the flux rings are formed using cylindrical laminated steel sections, preferably concentric layers of electronic steel bonded together with structural epoxy. The flux ring structure of the rotor of the motor 14 is optional. In certain embodiments, a conventional solid rotor ring may be used. The preferred motors are capable of approximately 20 peak horsepower for about 2 minutes. The batteries are preferably lithium polymer batteries but other suitable batteries may be used. An on-board battery charger (not shown) receives power from a standard household 110 volt outlet. In other embodiments, other types of electrically powered motors may be used. For example, motors of other suitable power and speed capacities and types (such as but not limited to inrunner brushless DC motors), may be used.

The motors 14 are mounted on the top, leading edge 15 of each wing 3 and 4 for driving four propellers 16. The motors 14 are oriented on the wings 3 and 4 such that the plane defined by the rotation of each propeller 16 is preferably inclined by 6° with respect to a central longitudinal plane of the wing to which they are attached such that the propellers 16 are orthogonal to the direction of flight of the vehicle when the vehicle is in horizontal flight. However, the angle of inclination of the plane of the propellers may vary in other embodiments depending upon the optimum characteristic of the vehicle, such as for but not limited to speed, load and angle of attack. For example, the angle of inclination may be as small as 0°, may a negative angle, or may be 3° for higher speed applications, or greater than the preferred 6°. In other embodiments, the inclination of the propellers on one wing may differ from the inclination of the propellers on the other wing. In certain embodiments, the propellers need not all have the same pitch angle. For example, when eight propellers are used, a first set of four propellers may have a certain forward pitch for high speed travel and a second set of four propellers may have a shallower pitch, relative to the forward pitch of the first set of four propellers, for hover. In other embodiments, the diameter of the propellers may vary. For example, smaller propellers may be selected for improved hover control. Other combinations of pitch, diameter, foil design and number of blades may be used according to the operational needs of the vehicle.

While each wing 3 and 4 is provided with four propellers 16, it will be appreciated that two, six, eight or more than eight propellers could be provided on each wing. Certain propellers rotated in one direction as indicated by the arrows A in FIG. 1 and all of the remaining propellers rotated in the opposite direction as indicate by arrows B in FIG. 1. The direction of rotation of each propeller may vary in other embodiments.

Figure 3:
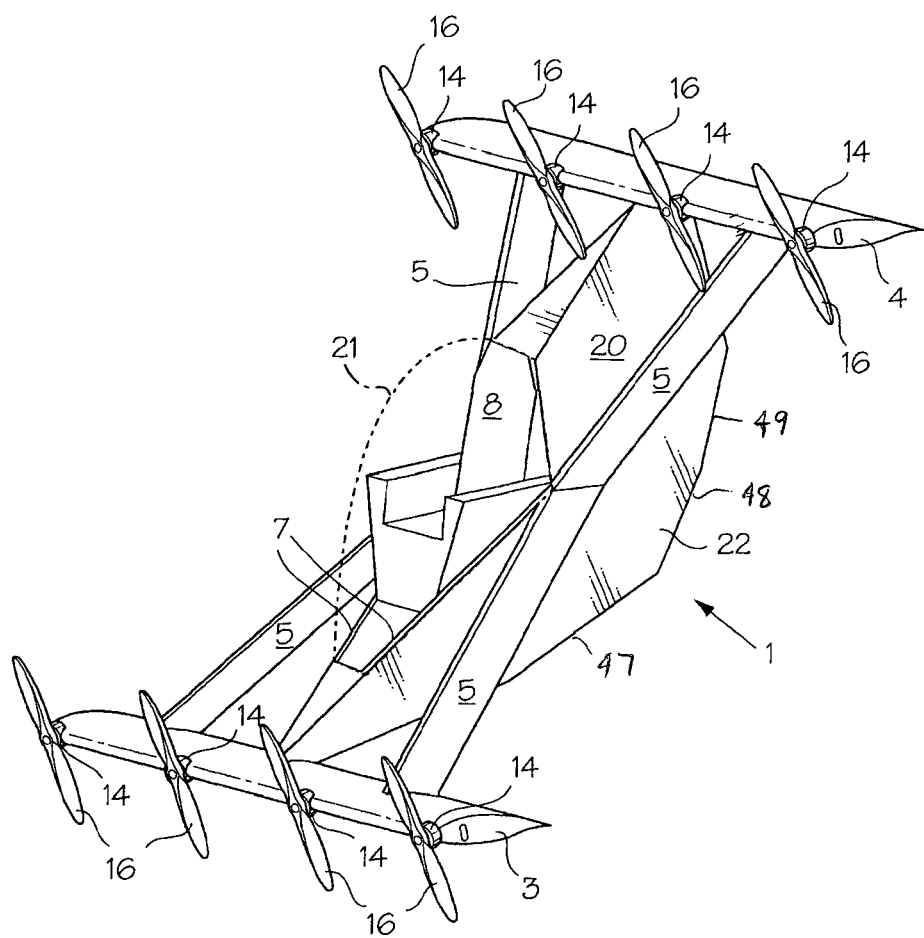
FIG. 3 is an isometric view of an aerial vehicle according to another embodiment of the present invention.
Figure 4:
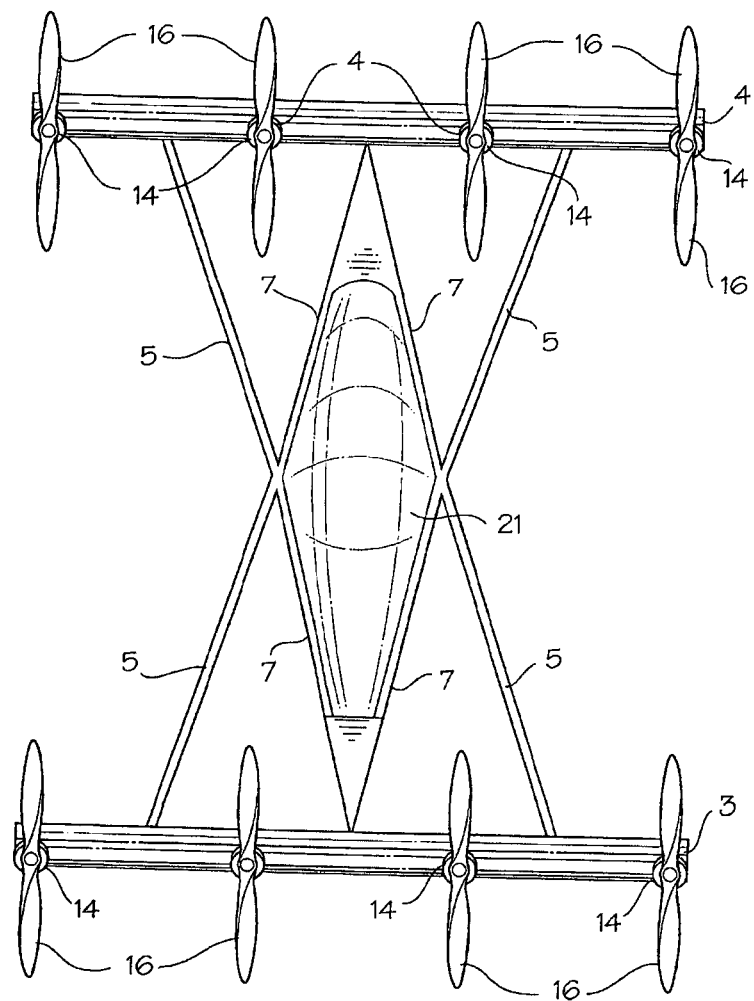
FIG. 4 is a top view of the vehicle of FIG. 3.
Figure 5:
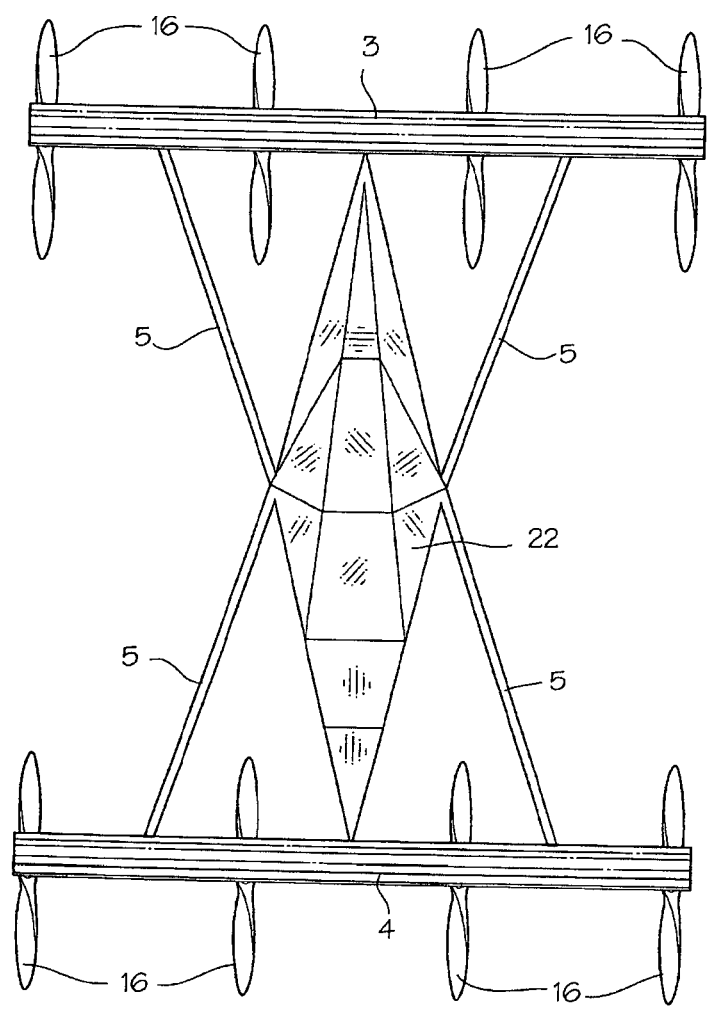
FIG. 5 is a bottom view of the vehicle of FIGS. 3 and 4.

The aerial vehicle of FIGS. 3 to 5 is similar to the vehicle of FIGS. 1 and 2 except that the cockpit 1 is part of a fuselage 20 extending between the centers of the front and rear wings 3 and 4 respectively. The fuselage 20 includes struts 5 (FIG. 3) and a skin covering the struts and a frame (not shown) behind the seat back 8. The cockpit 1 is covered by a domed canopy 21, and the bottom 22 of the fuselage 20 is multi-faceted. The bottom 22 includes a first bottom surface 47 at a first angle, a second bottom surface 48 at a second angle and a third bottom surface 49 at a third angle. This permits the vehicle when on the ground to site at three angles of repose. In certain embodiments, the vehicle may sit on bottom surface 47 at a first angle of repose or on bottom surface 48 at a second angle of repose or on bottom surface 49 at a third angle of repose. In certain embodiments, the surface on which to sit the vehicle may be chosen for example to facilitate take-off. For example, for a near horizontal take-off orientation, the vehicle may sit on the bottom surface 47. For a near vertical take-off orientation, the vehicle may sit on the bottom surface 49. It is understood that the bottom 22 is not limited to three bottom surfaces or to the angles depicted in FIG. 3. In certain embodiments, the bottom 22 may in whole or in part be curved or arcuate as opposed to multi-facetted. In certain other embodiments, the fuselage may not include struts or a canopy and the fuselage may be smooth or curved instead of multi-faceted.

Figure 6:
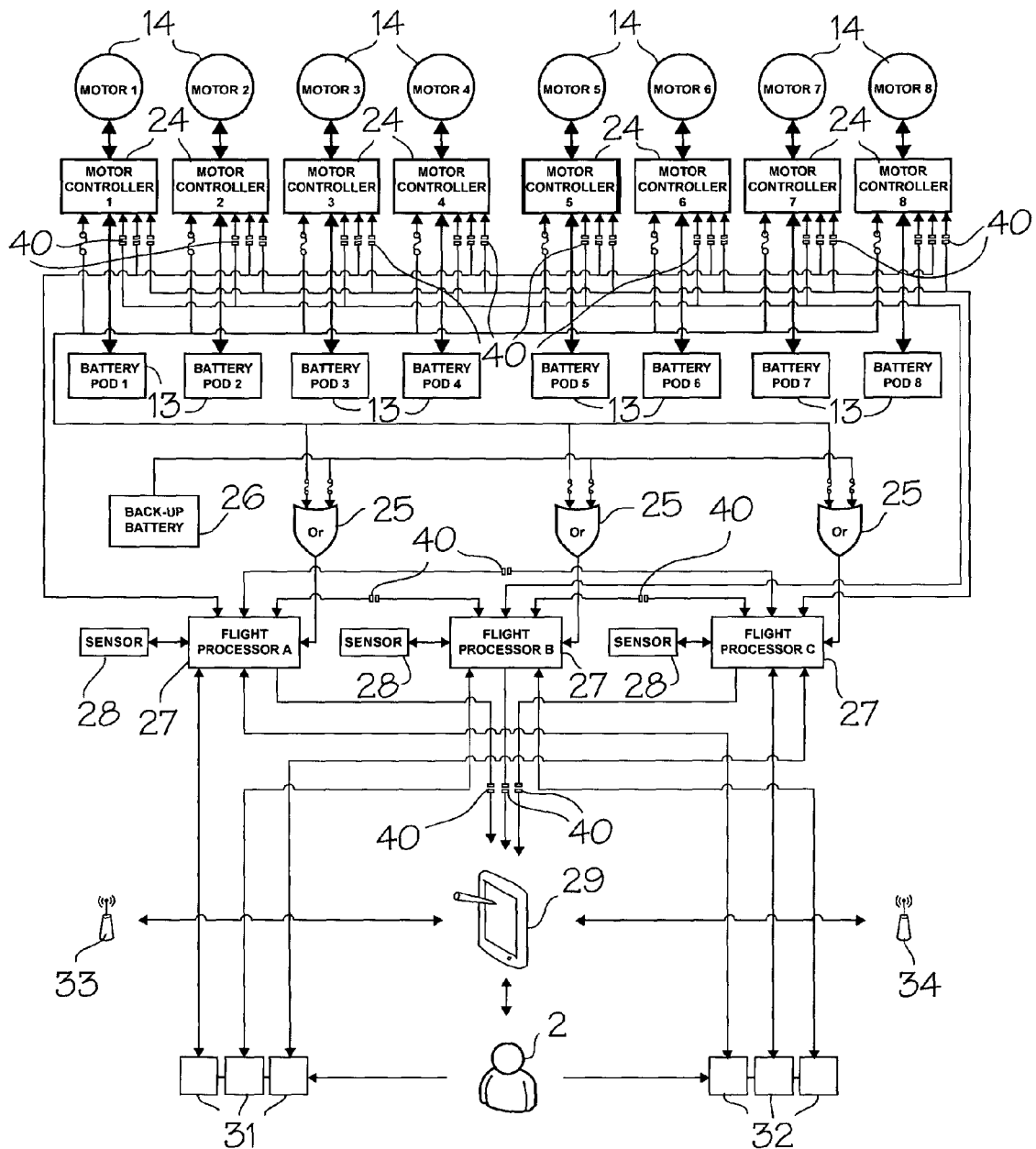
FIG. 6 is an electrical schematic of a flight control system usable in the vehicles of FIGS. 1 to 5.

Referring to FIG. 6, the operation of the aerial vehicle is controlled by a flight control system, which includes a motor controller 24 connecting each motor 14 to a battery 13. In FIG. 6, to facilitate an understanding of the control system, the motors 14 rotating in the direction of arrows A (FIG. 1) are labeled A1-A4, motors A1-A2 being on one wing 4 and motors A3-A4 being mounted on the other wing 3, and motors 14 rotating in the direction of arrows B are labeled B1-B4, motors B1-B2 being mounted on wing 4 and motors B3-B4 being mounted on wing 3. The batteries 13 and motor controllers 24 connected to the motors A2-A4 and B1-B4 are also labeled A1-A4 and B1-B4, respectively. The batteries 13 are in turn connected to three power supply type "OR" gates 25. A separate back-up battery 26 is connected to the "OR" gates 25 for providing emergency power in the event that the batteries 13 become sufficiently discharged that they can no longer operate the motors 14. Each "OR" gate 25 is connected to a flight processor 17, which is connected to a sensor package 28 for measuring one or more of the vehicle's velocity, orientation and acceleration.—Each sensor package preferably includes three solid state gyroscopes (not shown) for measuring rotational acceleration—in three orientations, three accelerometers (not shown) for measuring acceleration in three orientations, a magnetometer (not shown) for measuring magnetic field strength in three orientations, a barometric pressure sensor (not shown) and a GPS device (not shown). It will be appreciated that more or fewer sensor packages, more or fewer sensors per sensor package and fight processors can be used. However, it is preferred and advisable to have redundant controls in the vehicle. The flight processors 27 take input from the sensor packages 28 and using software running on each flight processor 27, each flight processor 27 acts as a virtual inertial measuring unit ("Virtual IMU") (not shown) and calculates vectors for a point on the aerial vehicle representing the centre of gravity. The vectors calculated include a position vector, an orientation vector, a velocity vector and an acceleration vector. These vectors can be calculated for points on the aerial vehicle other than the centre of gravity. Not all of the vectors need to be calculated, or not each time.

The flight processors 27 also provide data to a tablet computer 29 which acts as a display for the user 2. A different type of display may be used or omitted altogether. The GPS device is used to correct the Virtual IMU in accelerated frames of reference. The GPS device is optional.

Each flight processor 27 is also connected to a joystick 31 and a throttle stick 32 both of which are controlled by the operator 2 of the vehicle. A cellular network data link 33 and/or a WiFi data link 34 can be connected to the computer 29.

In operation, each processor 27 receives data from each sensor package 28 and uses a polling method to average out the sensor information and calculate the Virtual IMU which preferably is calculated at the center of gravity of the vehicle to calculate the orientation and altitude of the vehicle. The polled data is used by each processor to adjust the rotational speed of the propellers by sending the appropriate commands to the motor controllers. The motor controllers receive data from each of the processors 27 and use polling to determine which data to use in controlling the motors 14. The control system is adapted to provide thrust vector redundancy such that a loss of a motor will not result in "loss of control".

In certain embodiments, a suitable conventional IMU may be used wherein sensor data is processed in a conventional manner and not at a virtual point on the aerial vehicle.

In certain embodiments, it is not essential to use a polling method. Other conventional methods, implemented as programmed algorithms, to analyze the sensor information may be used. For example, in place of polling, outlier sensor information can be rejected and the remaining sensor information averaged.

On a full charge, the batteries 13 provide approximately 5 kilowatt hours of electrical energy. The lithium polymer batteries 13 must not be run down below a threshold electrical energy level, such as 5%. If they are depleted below that level, the battery is usually damaged. The threshold energy level can, however, be used as a one time battery power reserve. Should the energy level of one or more batteries fall below the threshold energy level, the remaining energy can be used on a one-time basis to continue to provide power to the motors 14 to enable the operator 2 to make an emergency landing. The operating range of the individual cells of the batteries is about 3.6 volts per cell (the minimum threshold electrical level where the battery is considered to be "empty") to 4.2 volts (where the battery is considered to be full). All of the batteries 13 are connected to a common bus and are thus interconnected. This provides for balancing of any asymmetrically loading of the motors 14 and also permits the motors 14 to draw energy from any of the batteries 13. No single low battery will be the limiting factor in the flight. The electrical connections between the batteries 13 and the motors 14 are preferably minimized to minimize resistance loses. Isolators 40 (groups of three isolators are identified by a single reference numeral 40) are provided to isolate certain components in the control system from power surges and the like Upon starting up the control system but without starting the motors 14, the voltage and temperature in each cell or set of cells of the battery, without the load of the motors, are measured. The battery voltages and temperatures are then used to derive the amount of stored energy in each battery by for example using a concordance table which relates battery voltage and temperature to stored energy level. The initial start-up energy of the cells of the batteries are recorded. Thereafter, for the duration of the flying session, the power flow in and out of each battery is measured. The power flow values are used to interpolate changes (as a result of depletion or charging) in stored energy for each of the batteries. The stored energy levels may be displayed to the operator in the form of a battery power level display.

In certain embodiments, the energy content of individual battery cells of the on-board energy storage system is measured by measuring the voltage under a static or no load condition, along with the temperature. A battery typically has a plurality of battery cells. With the measured static voltage and temperature the energy content at the measuring epoch can be calculated or determined from a look-up table. Changes in the energy content of the cells may be calculated by measuring the power flowing in (for example from charging) and out (for example from applying a load such as running the motors) of the battery cells.

In certain embodiments, the energy in each battery 13 is continuously determined by calculating the initial battery energy and then integrating the measured power over time. Initial battery energy is determined by measuring both voltage and temperature of each battery cell under substantially no-load conditions. A trivial load such as the load to run a multi-meter may be applied to the battery during measurement and still maintain a substantially no-load condition. While it is not essential to measure the temperature, measurement accuracy may be significantly affected depending upon the temperature and the measurement tolerances required. If the temperature is not measured, only the voltage measurement is related to stored energy level using a table of concordance or the like. The concordance between voltage and, voltage and temperature, to stored energy level for a battery cell may be determined, for example, through routine testing of a battery cell. The battery energy monitoring may be incorporated into the control system.

Figure 7:
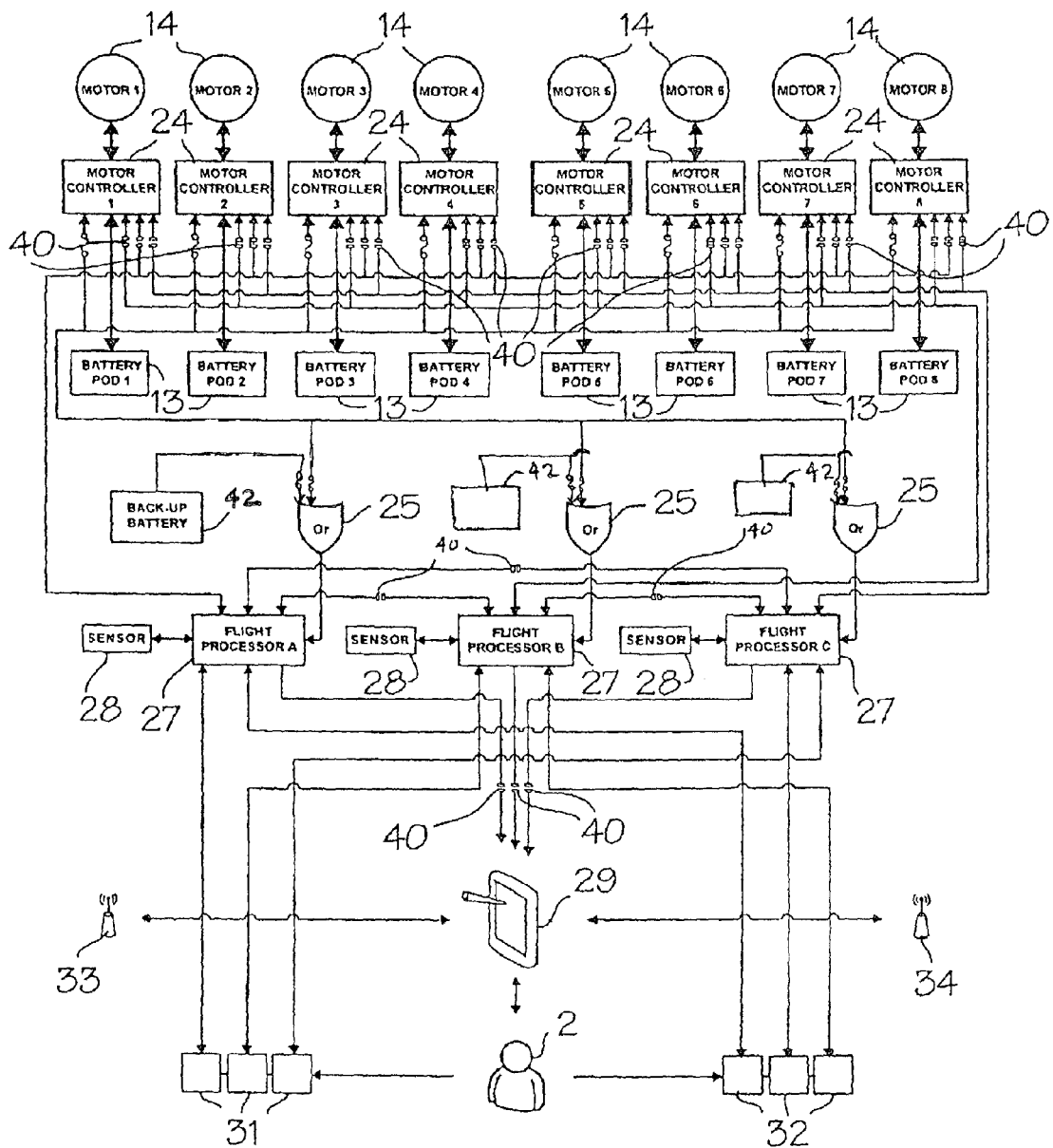
FIG. 7 is an electrical schematic of an alternate flight control system usable in the vehicles of FIGS. 1 to 5; and, FIG. 8 is an electrical schematic of an alternate flight control system usable in the vehicles of FIGS. 1 to 5.

Referring to FIG. 7, in another embodiment of the present invention, the control system is identical to that described herein with respect to FIG. 6 except that three back-up batteries 42 are provided instead of just one. Each back-up battery 42 is connected to an OR gate 25.

Referring to FIG. 8, in another embodiment of the present invention, the control system is identical to that described herein with respect to FIG. 7 except that a back-up joystick 44 and a back-up throttle 46 are provided with the associated wiring changes to accommodate them. Each flight processor 27 is also connected to back-up joystick 44 and back-up throttle stick 46 both of which are controlled by the operator 2 of the vehicle. The back-up joystick 44 provides identical functionality to joystick 31, and back-up throttle 46 provides identical functionality to throttle 32 are designed to provide redundant control functionality in the event of a failure of joystick 31 and/or throttle 32. In certain embodiments, the joystick 44 can provide lesser functionality to the joystick 31.

A regenerative braking/low power stability system is also provided. In a full power out situation, the propellers will "windmill" under control of a flight controller, allowing the vehicle to glide rather than to lose all dynamic stability as most multi-rotor, artificially stabilized aircraft would. The rotation of the propellers 16 can be used to charge the batteries 13 such that, if a sufficient charge is built up during the descent, the motors 14 may be restarted long enough to enable a controlled landing. In a full or partial power out situation, the glide and/or orientation of the vehicle can be controlled by controlling the rotational speed of the "windmilling" propellers. This is accomplished by increasing or decreasing the drag on the spinning propellers 16 by removing varying degrees of rotational energy. In this manner, aero-braking may be used to actively control orientation and glide angle of the vehicle in a full or partial power-out situation. For example, one or more motors may still be operating.

The regenerative braking system is optional. Varying the rotational speed of the motors, operating in an electrical generator mode, can be used to control the amount of power each motor is absorbing from the propeller and to use that power to charge the battery system, control the orientation and/or glide angle and/or speed of the vehicle. In certain embodiments, energy may be removed from the motors through resistive heating and the heat dissipated. In certain other embodiments, energy may be removed from the motors by using the electrical energy generated by the motor in generator mode to charge an on-board battery. In certain other embodiments, internal resistance of the motor may be used. For example, electrical switching may be used to alter the internal resistance of the motor. In certain other embodiments, mechanical breaking may be used to control the rotational speed of the motor. In certain embodiments, a combination of one or more of the foregoing energy absorbing methods and systems may be used. In certain embodiments, the control system is adapted to carry out control through regenerative braking.

The aerial vehicle is equipped with an optional ballistic parachute (not shown). The parachute is housed in a compartment located in the cockpit. The parachute is designed to be deployed in an emergency situation such as a power out situation.

In certain embodiments, the vehicle has an empty weight of approximately 250 lbs and a useful load of approximately 450 lbs. The gross take-off weight is approximately 700. The vehicle has a cruising speed of approximately 55 mph and a range (with reserve) of approximately 30 miles. The vehicle's hover power is approximately 50% of maximum power, hover power in ground effect is approximately 30% of maximum power and cruise power is approximately 10% of maximum power. The vehicle is not limited to such specifications.

As shown in FIGS. 1 and 3, when at rest, the vehicle preferably sits on the ground with the wings inclined at approximately 45° with respect to the ground. While an inclination of approximately 45° is preferred, the wings may be inclined with respect to the ground at an angle ranging from approximately 90° for fully vertical take off to approximately 0° for horizontal take-off. In alternative embodiments, the wings 3 and 4 are not parallel. The wing 3 for example may have a steeper "angle of attack" than the wing 4 to for example stall the wing 3 before the wing 4 such as in a power out glide situation. In other embodiments, the wing 3 may be designed with wing geometries (e.g. size, profile and orientation) that make the wing 3 conducive to gliding in a power out situation.

To take off, the tablet computer 29 is booted and the control system activated. Using the throttle stick 32, the motors 14 are turned on and the power increased to the point where the vehicle lifts from the ground in an approximately 45° degree trajectory with respect to the ground. Power to the motors 14 is adjusted as needed. The vehicle can continue to be flown in such a trajectory. To vary the inclination of the trajectory, such as to pitch the upper wing forward, the rotational speed of some or all of the propellers 16 on the upper wing 4 is increased relative to the propellers on the lower front wing 3 or the rotation of some or all of the lower wing propellers is decreased relative to the upper wing propellers or a combination thereof. This pitch control method also applies when the vehicle is in a vertical or a near vertical orientation, including for vertical or near vertical take off. This pitch control method may be used to decrease the angle of attack of the wings to transition to horizontal or near horizontal flight or to increase the angle of attack of the wings to move to vertical or near vertical flight. Take off can also occur in a slight reverse direction or a sideways direction.

To land, power may be adjusted such that the vehicle descends at a downward trajectory of approximately 45° with respect to the vertical. In other embodiments, the angle of attack of the wings can be increased to transition the vehicle from horizontal or near horizontal flight to a vertical or near vertical orientation and the vehicle may then descend to the ground by reducing power to the motors as needed.

In order to bank the vehicle in horizontal or relatively horizontal flight, the rotational speed of some of the propellers 16 is increased relative to the rotational speed of other propellers 16. In an embodiment where the propellers 16 driven by motors A1, A2, A3, A4 rotate in the same direction (such as indicated by arrows A), and the propellers driven by motors B1, B2, B3, B4 rotate in a counter direction (such as indicated by arrows B), the vehicle, may be banked by increasing the rotational speed of the propellers 16 driven by motors A1, A2, A3, A4 relative to the rotational speed of the propellers 16 driven by motors B1, B2, B3, B4. This may be accomplished by increasing the rotational speed of the motors A1, A2, A3, A4 and decreasing the rotational speed of the motors B1, B2, B3, B4, increasing the rotational speed of the motors A1, A2, A3, A4 while maintaining the rotational speed of the motors B1, B2, B3, B4, or maintaining the rotational speed of the motors A1, A2, A3, A4 while decreasing the rotational speed of the motors B1, B2, B3, B4. It will be appreciated that in other embodiments, other propeller rotation configurations can be similarly controlled.

In certain embodiments of the present invention, in order to conduct a turn of the vehicle around the yaw axis in horizontal flight or near horizontal flight, the rotational speed of the propellers 16 driven by motors A1, A2, B3 and B4 is increased or decreased relative to the propellers 16 driven by motors A3, A4, B1 and B2 in a manner analogous to that described herein with respect to banking. In certain embodiments, superposed modulation of motors A1, A2, A3 and A4 relative to motors B1, B2, B3 and B4 may be used to control the bank angle of the vehicle for a turn coordinated about the yaw and roll axes.

In certain embodiments of the present invention, the rotational speed of the propellers 16 on one side of the vehicle can be increased relative to the propellers on the other side to make a decoupled yaw turn while the vehicle is in horizontal or near horizontal flight such that the vehicle turns around the yaw axis but does not turn substantially around the pitch or roll axis. This is also sometimes referred to as a "skidding" turn in conventional aviation. The turn may be controlled by increasing the rotation of propellers driven by motors A1, A2, B3 and B4 relative to the speed of propellers driven by motors A3, A4, B1 and B2 while conducting superposed modulation of motors A1, A2, A3 and A4 relative to B1, B2, B3 and B4 motors in order to stabilize the vehicle about the roll axis. This will cause the vehicle to conduct a turn of the vehicle about the yaw axis while the vehicle does not turn substantially around the roll or pitch axes.

The propellers 16 are arranged in pairs in four quadrants relative to the centre of the vehicle. If one motor 14 fails during operation of the vehicle, power to the other motor 14 in the same quadrant can be increased to increase the rotational speed of the propeller 16 to compensate for the failure. For example, if motor A1 fails, power to motor A2 can be increased to compensate for the failure. The same compensation method may be applied to motors arranged in other configurations provided that the configuration is relatively symmetrical.

In the event of a failure of two motors 14 in the same quadrant during operation, a motor 14 in the opposite quadrant is reversed and the other motor 14 in that quadrant is modulated. For example, if motors A3 and A4 fail, motor A1 can be reversed and motor A2 modulated or alternatively, motor A2 can be reversed and motor A1 modulated.

It should be noted that the figures merely depict certain possible configurations of aerial vehicles that utilize the propulsion and control systems described herein, and that fewer or more motors 14 may be used without deviating from the spirit of the invention. Furthermore, the cockpit 1, fuselage 20 and struts are non-essential. Fewer or more wings can be used but there must be at least one wing or airfoil. Various wing structures and sizes can be used including a complete ring wing structure, as can other foil sections such as tapered and twisted. The propulsion and control systems according the present invention may be used as appropriate with such wings or foils. A flying wing structure can be employed such as a complete ring wing structure.

In certain embodiments of the present invention, the vehicle does not include a tail or rudder and can be substantially controlled by differential thrust, that is varying the thrust of one or more of the thrust producing elements. In certain other embodiments of the present invention, the vehicle does not include any control surfaces and can be substantially controlled by differential thrust. In certain other embodiments of the present invention, the vehicle does not include any control surfaces except for one or more trim tabs, and can be substantially controlled by differential thrust.

Aerial vehicles according to embodiments of the present invention are not limited to the control systems described herein. It will be appreciated that the control systems described herein are exemplary of control systems that may be used to control the vehicle. It will be appreciated that other suitable control systems, including synthetic control systems, may be used to carry out the desired control of aerial vehicles according to embodiments of the present invention.

The propulsion system for vehicles according to embodiments of the present invention are not limited to propellers. In certain embodiments, other thrust producing elements may be used such as turbines and ducted fans. Various combinations of different thrust producing elements may also be used.

Aerial vehicles according to embodiments of the present invention may be manned or unmanned. Aerial vehicles according to embodiments of the present invention may be controlled by a human operator in the vehicle or remotely or a combination thereof.

I claim:

1. An aerial vehicle comprising:
    a fuselage located on a central longitudinal axis of the vehicle,
    one or more at least two wings extending perpendicular to the central longitudinal axis, wherein the wings are stacked and spaced from each other along the central longitudinal axis,
    three or more thrust producing elements mounted in a fixed non-articulating relationship to the one or more at least two wings,
    a plurality of electric motors for driving the thrust producing elements,
    at least one battery for providing power to the motors, and
    a flight control system having a motor controller for controlling the rotational speed and direction of rotation of each thrust producing element.

2. The aerial vehicle according to claim 1 wherein the vehicle further comprises a bottom having a first facet at a first angle and a second facet at a second angle, whereby the vehicle rests at a first orientation when resting on the first facet and rests at a second orientation when the vehicle rests on the second facet.

3. The aerial vehicle according to claim 2 wherein the first orientation is conducive to a vertical or near vertical take-off and the second orientation is conducive to a horizontal or near horizontal take-off.

4. The aerial vehicle according to claim 1, wherein the number of thrust producing elements is selected from the group consisting of 3, 4, 6, 8, 10 and 12.

5. The aerial vehicle according to claim 1, wherein the thrust producing elements are selected from the group consisting of propellers, turbines and ducted fans.

6. The aerial vehicle according to claim 1, wherein
    the vehicle is tailless, and
    the control system is adapted vary the amount of rotational energy absorbed by individual motors when the individual motors are operated in a generator mode and are driven by rotation of the thrust producing elements connected to the individual motors,
    thereby effecting control of the orientation of the vehicle without the use of control surfaces.

7. The aerial vehicle according to claim 1, wherein
    the number of thrust producing elements is at least eight,
    the thrust producing elements are grouped into four quadrants with at least two thrust producing elements located in each quadrant,
    the control system is adapted to
    reverse the rotation of a first thrust control element in a first quadrant,
    vary the rotation of a second thrust control element in the first quadrant,
    when all thrust control elements are not operating in a quadrant opposite the first quadrant,
    thereby effecting control of the orientation of the vehicle.

8. The aerial vehicle according to claim 1, wherein one or more of the thrust producing elements are adapted for hover and one or more of the thrust producing elements are adapted for forward flight.

9. The aerial vehicle according to claim 1, further comprising:
    a battery energy level monitor for determining the energy level in the battery configured to
    take a first measurement of the voltage in the battery at an initial epoch under a substantially no-load condition,
    relate the voltage measurement to a value of potential energy stored in the battery at the initial epoch,
    take a second measurement of voltage in the battery and a measurement of current flow into or out of the battery at a subsequent epoch,
    integrate the second measurement of voltage and the current flow measurement with respect to time,
    determine an energy change from the integration,
    relate the energy change to the initial energy level to calculate the energy level of the battery at the subsequent epoch.

10. The aerial vehicle according to claim 1, wherein in horizontal or near horizontal flight, the control system is adapted to increase rotational speed of some of the thrust producing elements to make a yaw turn whereby the vehicle turns substantially around the yaw axis but does not turn substantially around the pitch or roll axis.

11. A method of operating an the aerial vehicle according to claim 1 comprising one or more wings, three or more thrust producing elements mounted in a fixed non-articulating relationship to the one or more wings, and a plurality of electric motors for driving the thrust producing elements, comprising:
    differentially varying the thrust of the thrust producing elements thereby altering the orientation of the vehicle.

12. The method according to claim 11 wherein the number of thrust producing elements is selected from the group consisting of 3, 4, 6, 8, 10 and 12.

13. The aerial vehicle according to claim 11, wherein the thrust producing elements are selected from the group consisting of propellers, turbines and ducted fans.

14. The method according to claim 11, further comprising:
    differentially varying the amount of rotational energy absorbed by the individual motors when the individual motors are operated in a generator mode and are driven by rotation of the thrust producing elements connected to the individual motors, thereby effecting control of the orientation of the vehicle without the use of control surfaces.

15. The method according to claim 11, wherein the number of thrust producing elements is at least eight and the thrust producing elements are grouped into four quadrants with at least two thrust producing elements located in each quadrant, further comprising:

reversing the rotation of a first thrust control element in a first quadrant, varying the rotation of a second thrust control element in the first quadrant, when all thrust control elements are not operating in a quadrant opposite the first quadrant, thereby effecting control of the orientation of the vehicle.

16. The method according to claim 11, wherein one or more of the thrust producing elements are adapted for hover and one or more of the thrust producing elements are adapted for forward flight.

17. The method according to claim 11 further comprising:
providing a battery for providing power to the motors,
monitoring the energy level in the battery comprising:
taking a first measurement of the voltage in the battery at an initial epoch under a substantially no-load condition,
relating the voltage measurement to a value of potential energy stored in the battery at the initial epoch,
taking a second measurement of voltage in the battery and a measurement of current flow into or out of the battery at a subsequent epoch,
integrating the second measurement of voltage and the current flow measurement with respect to time,
determining an energy change from the integration, and
relating the energy change to the initial energy level to calculate the energy level of the battery at the subsequent epoch.

18. The method according to claim 11 further comprising increasing rotational speed of some of the thrust producing elements to yaw the vehicle thereby inducing the vehicle to roll resulting in a coordinated turn.

19. The aerial vehicle according to claim 1, wherein the number of wings is two, the number of thrust producing elements is eight, the thrust producing elements comprise propellers, the thrust producing elements are grouped into four quadrants with two of the thrust producing elements per quadrant and four of the thrust producing elements mounted to each wing.

* * * * *